US010754338B2

(12) United States Patent
Deiters et al.

(10) Patent No.: US 10,754,338 B2
(45) Date of Patent: Aug. 25, 2020

(54) CONTROLLING AN AUTONOMOUS VEHICLE BASED UPON LABELS ASSIGNED TO OBJECTS REPRESENTED IN SENSOR DATA (71) Applicant: GM GLOBAL TECHNOLOGY OPERATIONS LLC, Detroit, MI (US)

(72) Inventors: Matthew Deiters, San Francisco, CA (US); Quinn Johnson, Oakland, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 16/103,548

(22) Filed: Aug. 14, 2018

(65) Prior Publication Data
US 2020/0057442 A1 Feb. 20, 2020

(51) Int. Cl.
G05D 1/00 (2006.01)
G05D 1/02 (2020.01)

(52) U.S. Cl.
CPC ......... G05D 1/0088 (2013.01); G05D 1/0246 (2013.01)

(58) Field of Classification Search
CPC ...... G05D 1/0088; G05D 1/0246; G05D 1/00; G05D 1/02; G06N 3/08; G06N 5/022; G06N 5/027
See application file for complete search history.

(56) References Cited

U.S. PATENT DOCUMENTS

| | | | |
|---|---|---|---|
| 9,576,185 B1 | 2/2017 | Delp | |
| 9,672,446 B1 | 6/2017 | Vallespi-Gonzalez | |
| 9,911,030 B1 | 3/2018 | Zhu et al. | |
| 9,990,687 B1 * | 6/2018 | Kaufhold | G06N 3/0454 |
| 2015/0356457 A1 * | 12/2015 | Ghosh | G06F 16/35 706/12 |
| 2018/0025272 A1 * | 1/2018 | Lin | G06N 3/063 706/25 |
| 2018/0032082 A1 * | 2/2018 | Shalev-Shwartz | B60W 30/0953 |
| 2019/0050648 A1 * | 2/2019 | Stojanovic | H04N 7/185 |
| 2019/0291720 A1 * | 9/2019 | Xiao | G06K 9/00805 |

* cited by examiner

Primary Examiner — Adam R Mott
Assistant Examiner — Seyyed Mustafa Sahafeyan
(74) Attorney, Agent, or Firm — Medley, Behrens & Lewis, LLC (57) ABSTRACT An autonomous vehicle controlled based upon the output of a trained object classifier is described herein. The object classifier is trained using labeled training data generated by a pipeline configured to assign labels to unlabeled sensor data. The pipeline includes transmitting sensor signal data capturing an object to individual computing devices for indications of an object type, wherein a label is assigned to the object based on the indications and provided to a data store as labeled training data. A learning system receives the labeled training data and generates a trained object classifier (e.g., a neural network) that is deployed in an autonomous vehicle to control operation of a mechanical system based on an output thereof.

19 Claims, 8 Drawing Sheets

CONTROLLING AN AUTONOMOUS VEHICLE BASED UPON LABELS ASSIGNED TO OBJECTS REPRESENTED IN SENSOR DATA

BACKGROUND

An autonomous vehicle is a motorized vehicle that can operate without human conduction. An exemplary autonomous vehicle includes a plurality of sensor systems, such as, but not limited to, a lidar sensor system, a camera sensor system, a radar sensor system, amongst others, wherein the autonomous vehicle operates based upon sensor signals output by the sensor systems. Typically, sensor signals are received by a computing system in communication with the plurality of sensor systems that may capture an object in proximity to the autonomous vehicle. The sensor signals are processed by the computing system to determine if an object has been detected and, based on the determination, the computing system executes instructions to control a mechanical system of the autonomous vehicle, for example, a vehicle propulsion system, a braking system, or a steering system, based upon the determination that the object has been detected.

Conventional navigation of an autonomous vehicle has relied upon detection of general "objects" at a specified distance from the vehicle. However, since not all objects exhibit the same characteristics, particularly with respect to motion, position, and other erratic features, simply determining a distance to an unknown object at a specified time may be insufficient to avoid a collision with the autonomous vehicle if the speed or trajectory of the unknown object suddenly changes. Therefore, a computing system configured to differentiate between various types of objects facilitates complex decision making in regard to navigation and operational control of the vehicle.

Some autonomous vehicles include object classifier systems that assign labels to objects, wherein the labels are indicative of identities of the objects. An object classifier system is trained to recognize objects in sensor data (e.g., images, lidar scans, radar scans, combinations thereof, etc.) through use of labeled training data. Because the autonomous vehicle is expected to operate in a variety of conditions (e.g., at night, during rain, during foggy conditions, and so forth), a large amount of training data, across several driving contexts, is desired to accurately train the object classifier system to label a detected object.

SUMMARY

The following is a brief summary of subject matter that is described in greater detail herein. This summary is not intended to be limiting as to the scope of the claims.

Described herein are various technologies pertaining to controlling an autonomous vehicle based upon labels assigned to objects represented in sensor data. With more specificity, described herein are various technologies pertaining to assigning a label to an object captured in a sensor signal, wherein the label is indicative of a type of object (e.g., pedestrian, bike, car, truck, bus, static object, etc.). With still more specificity, described herein is an object classifier system that is trained based upon labeled training data, wherein the labeled training data is generated by transmitting a sensor signal to computing devices operated by users who are trained to identify types of objects, and wherein indications are provided from the computing devices of an object captured in the sensor signals. A control system additionally receives an output from the object classifier system that is based on the labeled training data to manipulate a mechanical system of the autonomous vehicle, such as a vehicle propulsion system (e.g., engine, motor, etc.), steering system, or braking system, in accordance with characteristics of the object identified in the output.

The aspects described herein include a computer-implemented pipeline (i.e., which includes several computer-acts performed by computing systems in network communication with one another), wherein labeling tasks are distributed to computing devices in which human operators are able to assign consistent labels to objects represented in sensor data. After the labels are assigned, the labeled sensor data is used to train an object classifier system, which is subsequently deployed on an autonomous vehicle. The control system controls the autonomous vehicle based on the output of the object classifier system trained using the labeled training data.

This process begins by sampling sensor data from a field of view of a vehicle, wherein the sensor data can be two-dimensional image data, three-dimensional lidar data, three-dimensional radar data, etc. In particular, the vehicle includes a plurality of sensors, and the sensors generate sensor data while the vehicle navigates about a roadway. At least some of the sensor data generated by the sensors is persistently stored, for example in a data storage device on the vehicle or on a data storage device that is remotely situated from the vehicle (e.g., where the sensor data is transmitted over a network connection from the vehicle to the data storage device). For instance, the vehicle may have a camera attached to it that generates a number of frames capturing one or more objects, and the frames are stored in persistent storage. If not already transferred, the frames are transferred from the vehicle to a data store of a computing system that is external to the vehicle. Subsequently, a labeling pipeline is initiated, wherein the labeling pipeline comprises a plurality of computing systems and acts performed by the computing systems in connection with assigning labels to frames, wherein the labels are indicative of objects represented in the frames.

With more specificity, sampling is undertaken over the frames, such that certain frames are extracted from the number of frames, and for each sampled frame, the following occurs: 1) a frame is transmitted by a first computing device to a first set of two client computing devices operated by two different human labelers, where the two human labelers are tasked with identifying objects of any type in the frame by, for instance, manually identifying locations in the frame where the objects are captured; 2) the labeled frame is subsequently transmitted back to the first computing device by each of the two computing devices in the first set of computing devices operated by the two human labelers; 3) the server computing device determines whether there is agreement between the labels received from the two computing devices in the first set of computing devices; 4) when the labels are consistent, the first computing device permanently assigns the labels to the frame; 5) when the labels are inconsistent, the first computing device transmits the frame to a computing device operated by a third human labeler, wherein input received at the computing device from the third human labelers acts as a tie-breaker. In other words, steps 3), 4), and 5) are directed towards merging data received from multiple computing devices.

Responsive to the merging operation performed, 6) the first computing device transmits the frame to a second set of two computing devices operated by another two human labelers, wherein these two human labelers are trained to identify objects as being either a) static, or b) non-static (moving or capable of moving); 7) the two computing devices in the second set of computing devices receive input from the two human labelers as to which objects are static and which objects are non-static; 8) the two computing devices in the second set of computing devices transmit the labels to the first computing device; 9) the first computing device determines whether there is agreeance between the labels received from the computing devices in the second set of computing devices; 10) when there is agreeance between the labels, the first computing device permanently assigns the labels to the frame; 11) when there is a disagreement, the first computing device transmits the frame to another computing device operated by another human labeler, wherein the another computing device receives input from the human labeler as to whether object(s) captured in the frame are static or non-static, and further wherein the first computing device treats such input as a tie-breaker. Thus, again, the frame is transmitted to multiple computing devices, and the first computing device merges information (labels) received from the multiple computing devices.

This process repeats to allow for continuously more narrow labels to be applied to objects represented in the frame. For example, the first computing device can transmit the frame to a third set of two computing devices operated by yet another two human labelers, wherein such human labelers are tasked with assigning a label of "car" to objects previously labeled as being "non-static" (wherein such objects are cars). The first computing device merges the information received from the third set of computing devices, as described above, and transmits the frame to a fourth set of two computing devices. The fourth set of two computing devices are operated by still yet another set of human labelers who are trained to assign labels of "economy" to objects previously labeled as being "cars". This process repeats until the label assigned to the object represented in the frame has reached the most granular level in a predefined taxonomy. An exemplary taxonomy tree may include up to sixty-seven potential labels spanning several hierarchical layers.

While in the examples set forth above, labels are applied to a frame, it is to be understood that labels can be assigned to a set of spatially and temporally overlapping sensor data. Accordingly, a computing device operated by a human labeler can be provided with both 2-dimensional sensor data (an image) and 3-dimensional sensor data (a point-cloud generated by a lidar sensor system). The end result of the process is that labels are assigned to the sensor data to generate 2-dimensional and 3-dimensional labeled training data. One or more object classifier systems are trained based upon the labeled training data, and the object classifier system is subsequently deployed in an autonomous vehicle, where it is configured to assign classifications to objects in real-time.

Thus, the pipeline described above includes several stages corresponding to different labels that can be assigned to objects represented in sensor data. The description set forth above indicates that each stage involves receiving input from trained human labelers; in an exemplary embodiment, the human labelers in a stage can be replaced by a computing system, wherein the computing system comprises a classifier that is trained to assign certain labels to sensor data. Therefore, as more training data is generated, classifiers can be trained to automate stages of the pipeline (e.g., when the classifiers are able to assign labels at a sufficient level of accuracy).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to controlling operation of an autonomous vehicle through use of data labels assigned to objects by an object classifier system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean serving as an illustration or example of something and is not intended to indicate a preference.

Figure 1:
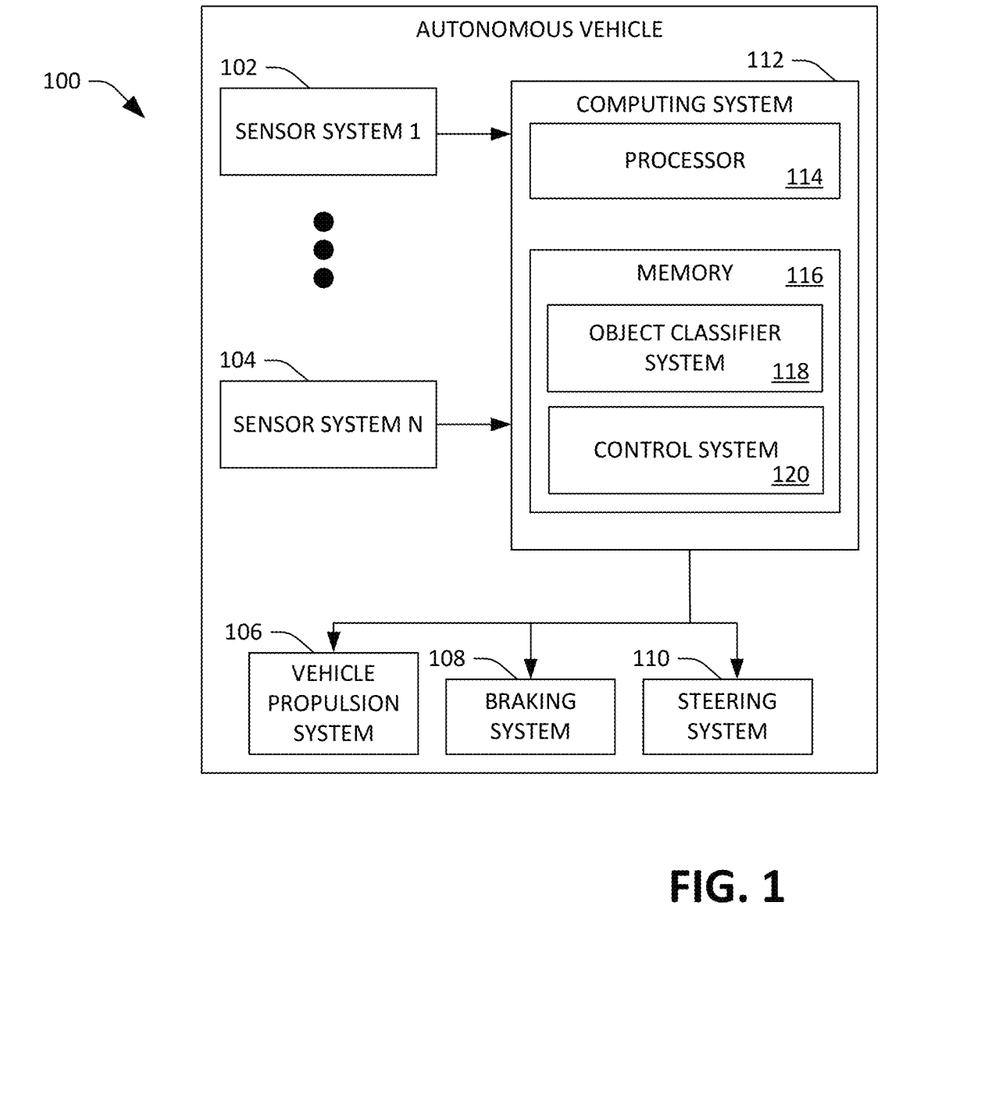
FIG. 1 illustrates an exemplary autonomous vehicle.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems 102-104 (a first sensor system 102 through an Nth sensor system 104). The sensor systems 102-104 are of different types and are arranged about the autonomous vehicle 100. For example, the first sensor system 102 may be a lidar sensor system and the Nth sensor system 104 may be a camera (image) system. Other exemplary sensor systems include radar sensor systems, global positioning system (GPS) sensor systems, sonar sensor systems, infrared sensor systems, and the like.

Each sensor system in the plurality of sensor systems 102-104 may comprise multiple sensors. For example, the first sensor system 102 may comprise a first sensor, a second sensor, etc. Furthermore, some or all of the plurality of sensor systems 102-104 may comprise articulating sensors. An articulating sensor is a sensor that may be oriented (i.e., rotated) by the autonomous vehicle 100 such that a field of view of the articulating sensor may be directed towards different regions surrounding the autonomous vehicle 100.

The autonomous vehicle 100 further includes several mechanical systems that are used to effectuate appropriate motion of the autonomous vehicle 100. For instance, the mechanical systems can include but are not limited to, a vehicle propulsion system 106, a braking system 108, and a steering system 110. The vehicle propulsion system 106 may be an electric motor or a combustion engine. The braking system 108 can include an engine break, brake pads, actuators, and/or any other suitable componentry that is configured to assist in decelerating the autonomous vehicle 100. The steering system 110 includes suitable componentry that is configured to control the direction of movement of the autonomous vehicle 100.

The autonomous vehicle 100 additionally comprises a computing system 112 that is in communication with the sensor systems 102-104 and is further in communication with the vehicle propulsion system 106, the braking system 108, and the steering system 110. The computing system 112 includes a processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 116 comprises an object classifier system 118 that is configured to assign labels to predefined types of objects (in proximity to the autonomous vehicle 100) captured in sensor signals output by the sensor systems 102-104. These predefined types of objects can include, but are not limited to, pedestrian, bike, car, truck, bus, and static (unknown), where the type "static" can represent telephone poles, construction equipment, etc. In a specific example, the sensor systems 102-104 may include a radar sensor system. A radar sensor of the radar sensor system can emit a radio wave in a direction external to the autonomous vehicle 100. The radio wave may encounter an object and be reflected back towards the radar sensor, and the object recognition system 118 may assign a label to the object based upon the reflected radio wave.

The memory 116 additionally includes a control system 120 that is configured to receive output of the object classifier system 118 and is further configured to control at least one of the mechanical systems (the vehicle propulsion system 106, the brake system 108, and/or the steering system 110) based upon the output of the object classifier system 118.

Figure 2:
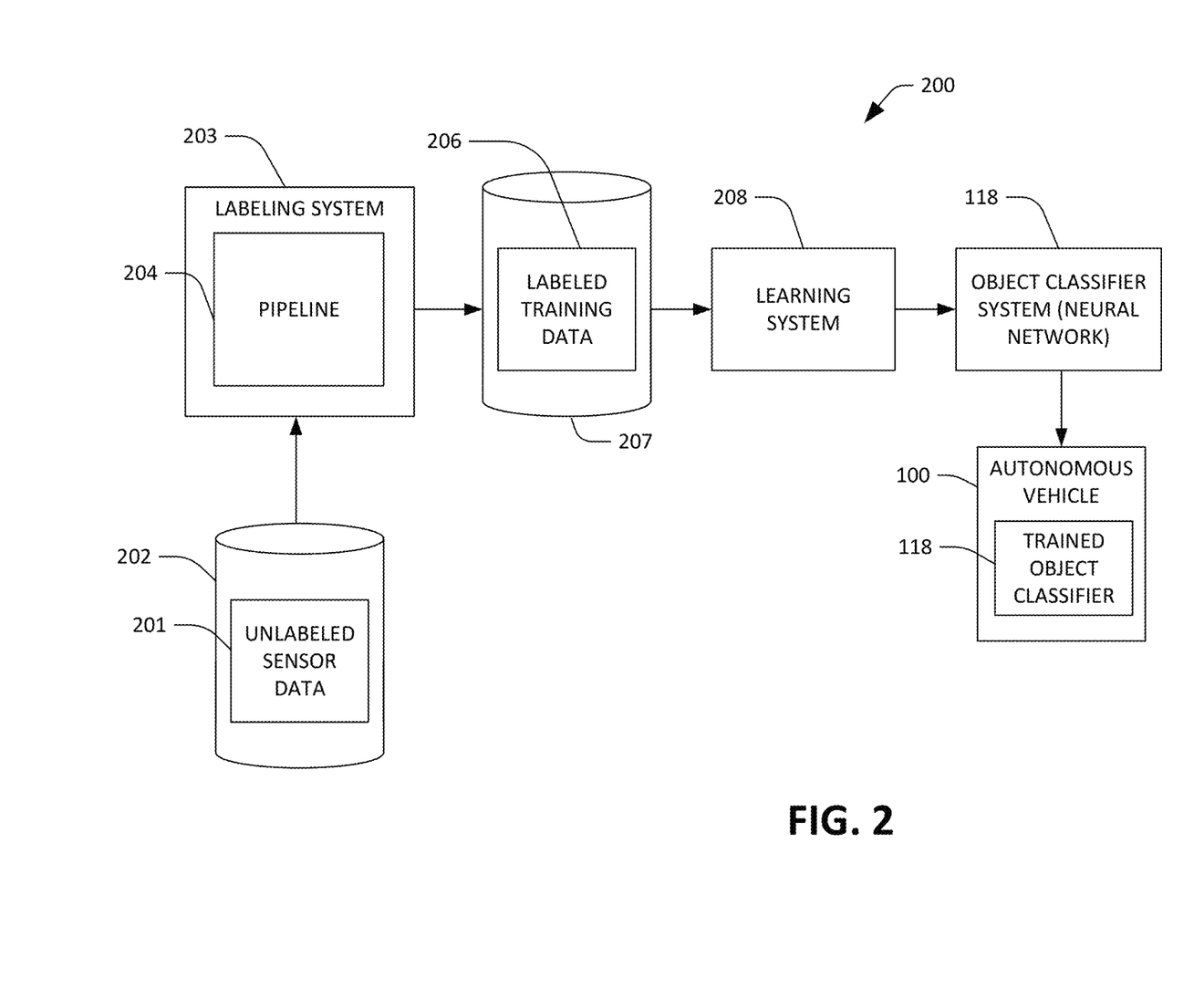
FIG. 2 is a flow diagram that illustrates a process for training an object classifier to control an autonomous vehicle.

With reference now to FIG. 2, a flow diagram 200 is illustrated which represents a process for training the object classifier system 118 and deploying the object classifier system 118 in the autonomous vehicle 100, wherein the object classifier 118 is trained based upon labeled training data generated by a pipeline used to assign labels to unlabeled sensor data. Unlabeled sensor data 201 is generally collected by a data collection vehicle having a plurality of sensor systems affixed thereto and in communication with local data storage that stores the data generated by the sensor systems. Alternatively, the data collection vehicle can be configured to stream sensor data to a data storage device that is external to the data collection vehicle (e.g., by way of a network connection). The data collection vehicle, which may be a driver-operated vehicle or an autonomous vehicle, is navigated about various roadways to generate sensor data capturing objects in proximity to the vehicle. Thus, at any given point in time, a field of view is recorded from the perspective of the data collection vehicle in the form of unlabeled sensor data 201, such as two-dimensional image data and/or three-dimensional lidar data. In an exemplary embodiment, when the data collection vehicle has gathered a desirable quantity of data via the plurality of sensor systems, the unlabeled sensor data 201 is extracted from the local data storage of the vehicle and provided to a data storage device 202 that is external to the data collection vehicle.

The unlabeled sensor data 201 is provided to a labeling system 203 that is configured to assign labels to objects represented in the unlabeled sensor data 201. The labeling system 203 includes several computing devices that are in network communication with one another, wherein a subset of the computing devices are operated by human labelers that are trained to assign certain (and fairly specific) types of labels to sensor data. The labeling system 203 incorporates a pipeline 204 to assign labels to sensor data, wherein the pipeline 204 is described in further detail below with reference to FIGS. 3-5. Generally, the pipeline 204 is a collection of computing devices and a sequence of steps that are well-suited for assigning labels to sensor data.

The pipeline 204 uses a two-stage process to label objects in the unlabeled sensor data 201. First, the pipeline 204 includes an annotation phase in which a plurality of general objects captured in the sensor data are identified for labeling (e.g., two-dimensional boxes and/or three-dimensional cubes are placed around objects). Second, the pipeline 204 includes an enrichment phase to further define the identified objects. The enrichment phase is based on a taxonomy that begins at its highest level with a broad element of distinction (e.g., moving objects v. static objects) and moves through levels of increasing granularity such that a multi-layered label is assigned to a boxed object. For example, one of vehicle, bike, or pedestrian may be assigned to "moving objects", then one of car, truck, or bus may be assigned to "vehicle", then one of mid-size or full-size to may be assigned to "car". In an alternative example, one of charter bus, school bus, mini bus, or miscellaneous bus may be assigned to a next label layer beneath "moving objects 4 vehicle", where the bus type may be even further distinguished according to geographically-based designs (e.g., buses in San Francisco have a different look different than buses in Washington, D.C.). This process of data flow division proceeds through the taxonomy until a distinctive multi-layered label is assigned to an object defined by the pipeline 204 incorporated in the labeling system 203. The enrichment phase noted above repeats for each objected that is identified in the annotation phase, thereby providing a collection of labeled training data 206 based on detailed label information.

The labeled training data 206 is stored on a data storage device 207 (which may be the same data storage device used to store the unlabeled sensor data 201 or a different data storage device). A learning system 208 (executed by a computing system) receives the labeled training data 206 and generates the (trained) object classifier system 118 (e.g., a neural network) based upon the labeled training data 206. The object classifier system 118 is then deployed in the autonomous vehicle 100, where the output of the object classifier system 118 is used in connection with controlling the operation of mechanical systems in the autonomous vehicle 100 as the autonomous vehicle 100 navigates about roadways.

Figure 3:
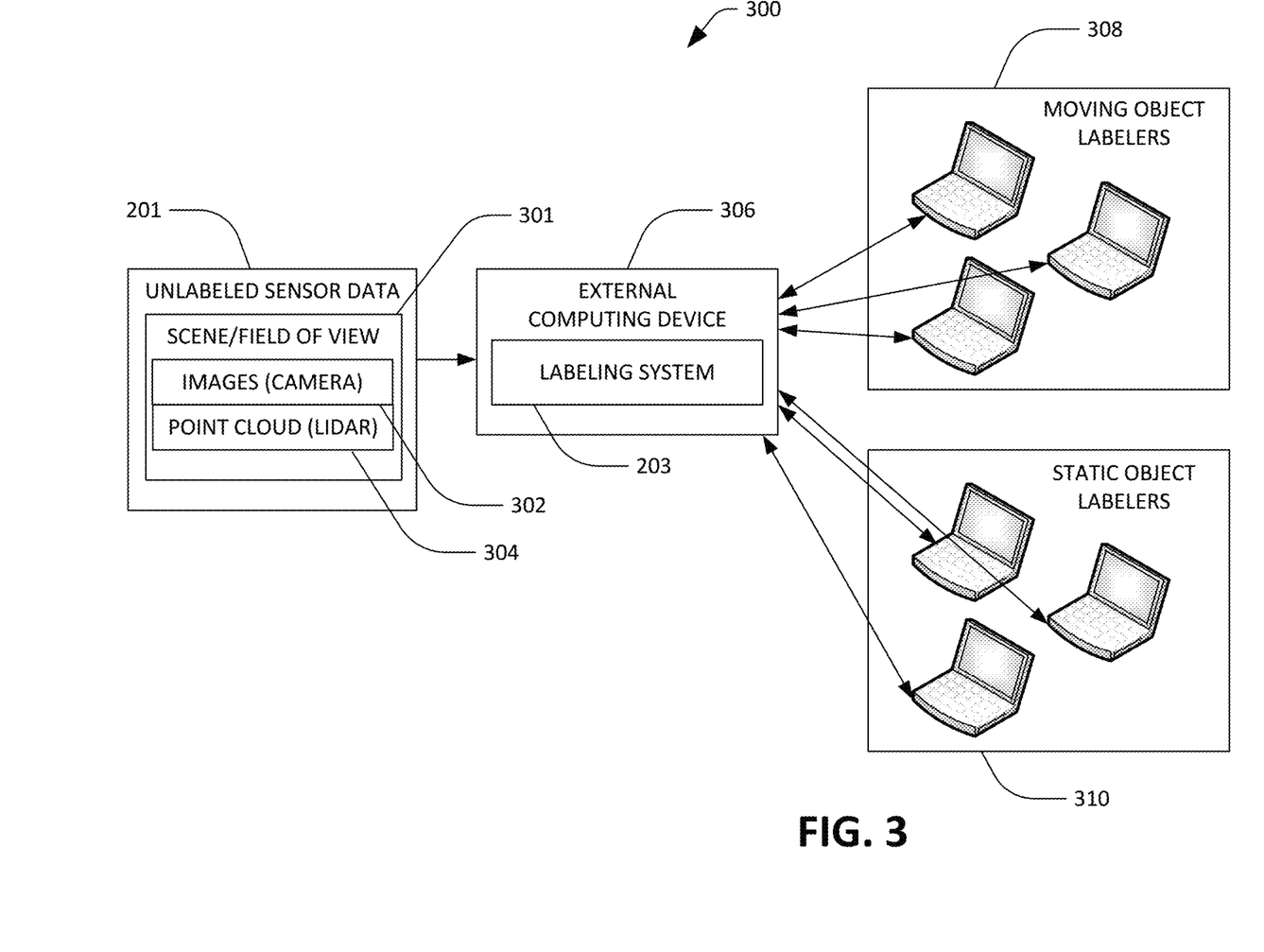
FIG. 3 illustrates an exemplary step in a pipeline for differentiating moving objects and static objects.

Referring now to FIG. 3, an exemplary step 300 in the pipeline 204 is illustrated that differentiates moving objects and static objects. Unlabeled sensor data 201 which captures a scene/field of view 301 from the perspective of sensor systems affixed to a data collection vehicle is initially accumulated on a local data storage of the data collection vehicle. The scene/field of view 301 may be represented by data generated from different types of sensor systems (e.g., camera or lidar) to thereby capture the same scene/field of view 301 through a plurality of different sensor signals, such as images 302 or a point cloud 304. The unlabeled sensor data 201 is provided from the data collection vehicle to an external computing device 306 that includes the labeling system 203.

The labeling system 203 comprises an annotation phase where general objects captured in the scene/field of view 301 are identified and boxed. The external computing device 306 then initiates a first stage of the pipeline 204 by providing the unlabeled sensor data 201 (including the boxed objects) to a first pair of computers operated by moving object labelers 308 and a second pair of computers operated by static object labelers 310. The sole job of the moving object labelers 308 is to initiate a command for the first pair of computers to identify moving objects that were boxed in the unlabeled sensor data 201, while the sole job of the static object labelers 310 is to initiate a second command for the second pair of computers to identify static objects that were boxed in the unlabeled sensor data 201. A label is permanently assigned to an object when a pair of computers in a respective group (308 and 310) assign the same label to the boxed object in the sensor data.

A third computing device is illustrated among the moving object labelers 308 and the static object labelers 310 in case an arbitration (i.e., a tie-breaker) is needed to resolve a disagreement between the labels assigned by the first two computing devices in the pair of computers. The external computing device 306 receives the labels assigned by the pair of computers operated by the moving object labelers 308 and the static object labelers 310 and updates the unlabeled sensor data 201 with a label of "moving object" or "static object".

Figure 4:
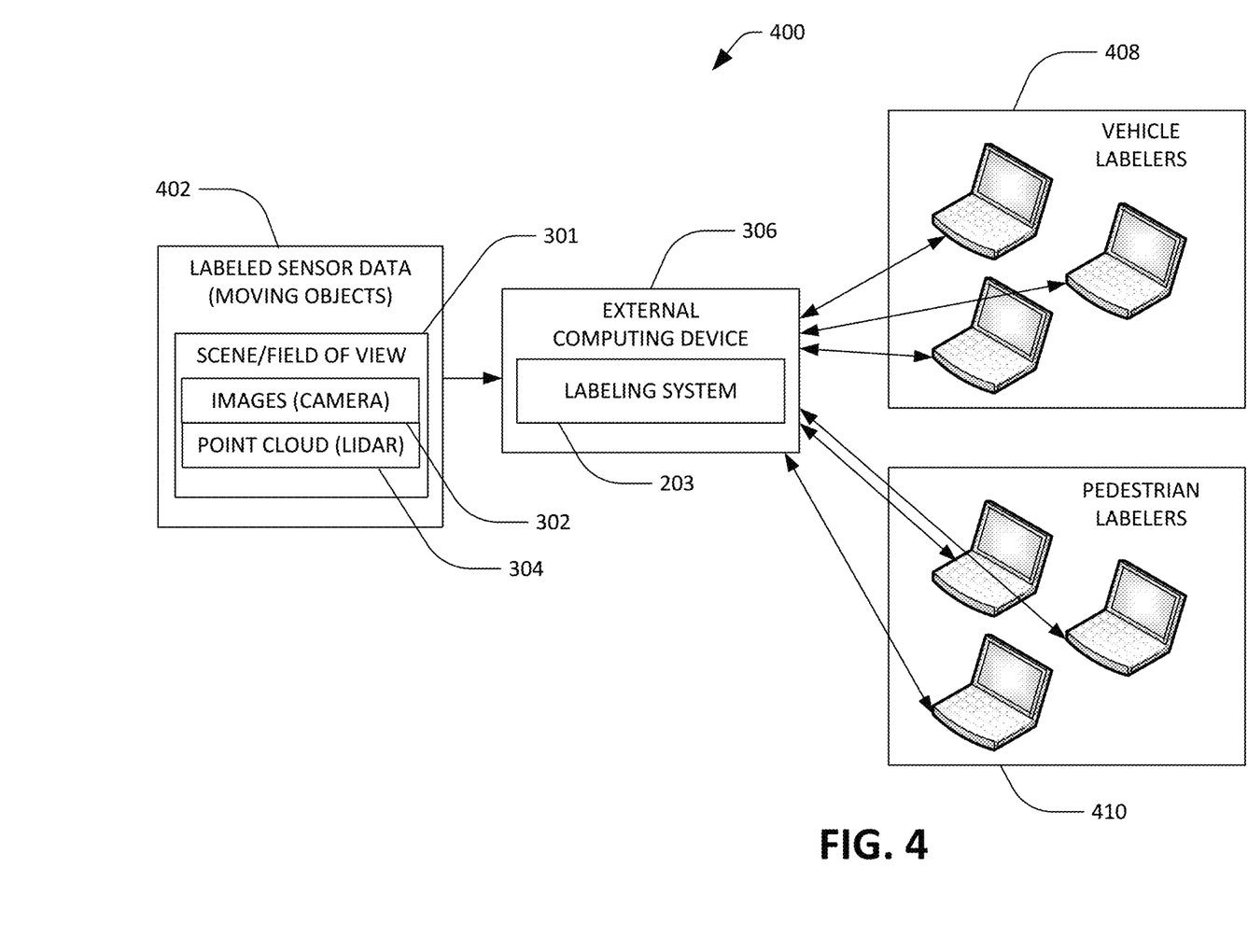
FIG. 4 illustrates an exemplary step in a pipeline for differentiating vehicles and pedestrians.

Referring now to FIG. 4, a second exemplary step 400 in the pipeline 204 is illustrated that differentiates vehicles and pedestrians. In this step, a label of "moving object" was previously assigned to a boxed object captured in the scene/field of view 301, for example, by camera images 302 and/or a lidar point cloud 304. The sensor data now incorporating the moving object label is stored as labeled sensor data 402 where it may be further refined by adding additional layers/levels to the moving object label.

The labeled sensor data 402 (with boxes around moving objects) is transmitted to the external computing device 306 were the labeling system 203 is used to initiate a second stage of the pipeline 204. In particular, the labeling system 203 defines the next level of labels in the taxonomy that should be added to the boxed object. In the exemplary step, the next level of labels includes "vehicle" and "pedestrian". The labeled sensor data 402 having a moving object label is provided to a first pair of computers operated by vehicle labelers 408 and a second pair of computers operated by pedestrian labelers 410. The sole job of the vehicle labelers 408 is to initiate a command for the first pair of computers to identify moving objects that are vehicles, while the sole job of the pedestrian labelers 410 is to initiate a command for the second pair of computers to identify moving objects that are pedestrians. A label is permanently assigned to an object when a pair of computers in a respective group (408 and 410) assign the same label to the moving object.

A third computing device is illustrated among the vehicle labelers 408 and the pedestrian labelers 410 in case an arbitration (i.e., a tie-breaker) is needed to resolve a disagreement between the labels assigned by the first two computing devices in the pair of computers. The external computing device 306 receives the labels assigned by the pair of computers operated by the vehicle labelers 408 and the pedestrian labelers 410 and merges the updated labels back into the labeled sensor data 402. If the label assigned by the third computing device does not agrees with either of the labels assigned by the first two computing devices, a new classification for the object may be proposed. This process includes passing the boxed object through a question and answer phase, encouraging consistency in results with prior labels/work, and optionally bypassing a longer refining process for a new label.

Figure 5:
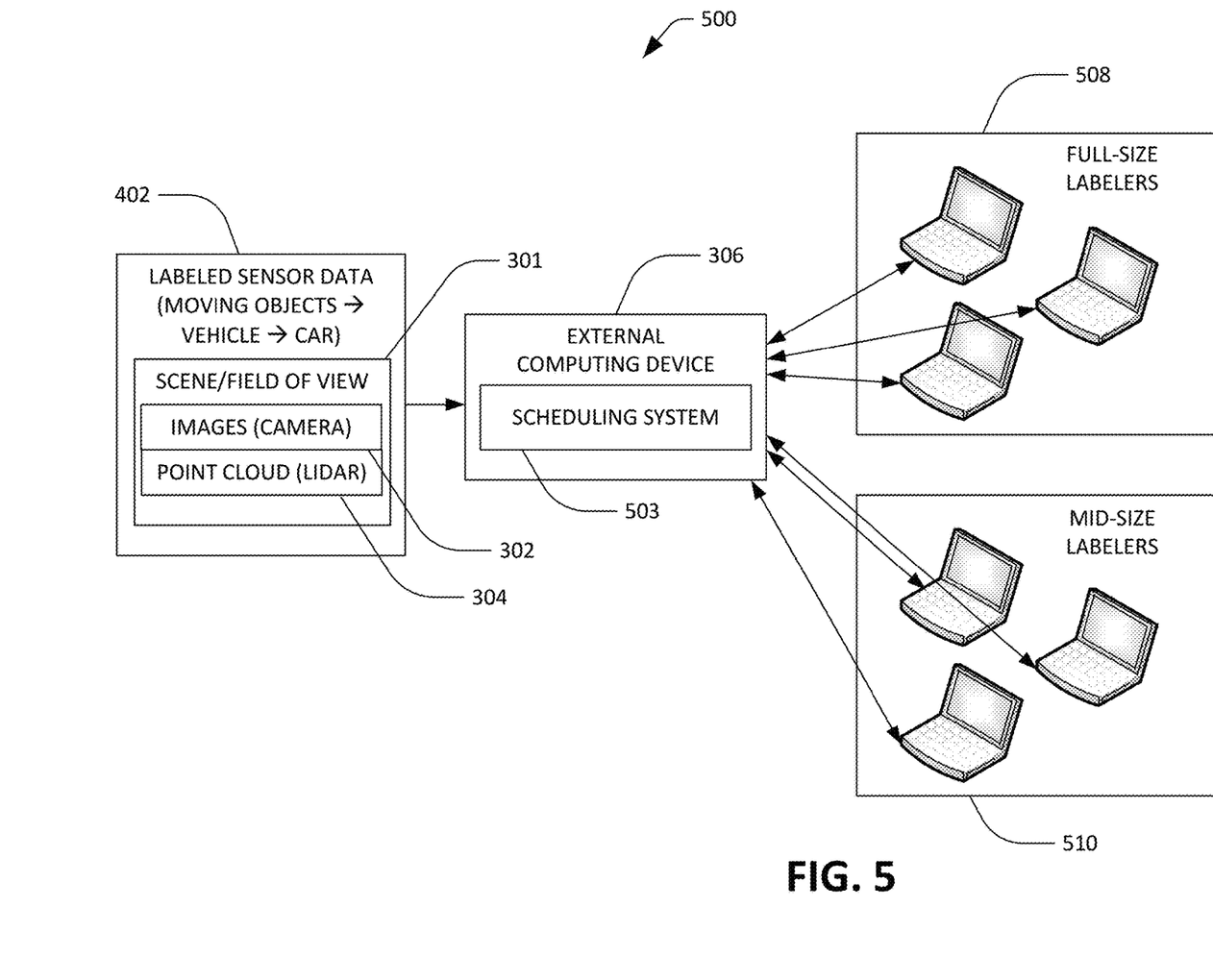
FIG. 5 illustrates an exemplary step in a pipeline for differentiating mid-size cars and full-size cars.

Referring now to FIG. 5, a further exemplary step 500 in the pipeline 204 is illustrated that differentiates full-size cars and mid-size cars. In this step, a label of "moving object vehicle car" was previously assigned to a boxed object captured in the scene/field of view 301, for example, by camera images 302 and/or a lidar point cloud 304. The sensor data now incorporating the moving object vehicle car label is stored as labeled sensor data 402 where it may be further refined by adding additional layers/levels to the label or adopted by a scheduling system 503 as the most granular label available in the labeling system 203 and transmitted to a data store 207 as labeled training data 206.

The labeled sensor data 402 (with boxes around moving objects identified as vehicles and further identified as cars) is transmitted to the external computing device 306 were the labeling system 203 is used to initiate a further stage of the pipeline 204. In particular, the labeling system 203 defines a further level of labels in the taxonomy that should be added to the boxed object. In the exemplary step, the next level of labels includes "full-size cars" and "mid-size cars". The labeled sensor data 402 having a moving object→vehicle→car label is provided to a first pair of computers operated by full-size car labelers 508 and a second pair of computers operated by mid-size car labelers 510. The sole job of the full-size car labelers 508 is to initiate a command for the first pair of computers to identify cars that are full-size cars, while the sole job of the mid-size car labelers 510 is to initiate a command for the second pair of computers to identify cars that are mid-size cars. A label is permanently assigned to an object when a pair of computers in a respective group (508 and 510) assign the same label to a car.

A third computing device is illustrated among the full-size car labelers 508 and the mid-size car labelers 510 in case an arbitration (i.e., a tie-breaker) is needed to resolve a disagreement between the labels assigned by the first two computing devices in the pair of computers. The external computing device 306 receives the labels assigned by the pair of computers operated by the full-size car labelers 508 and the mid-size car labelers 510 and merges the updated labels back into the labeled sensor data 402. If the label assigned by the third computing device does not agree with either of the labels assigned by the first two computing devices, a new classification for the object may be proposed. Once the layers added to the label of a boxed object have reached the most granular level available in the labeling system 203, the sensor signal data capturing the object is provided to a data store 207 of the external computing system 306 as labeled training data 206, where a learning system 208 generates a trained object classifier 118 that is deployed in an autonomous vehicle 100 for controlling vehicle operations.

Figure 6:
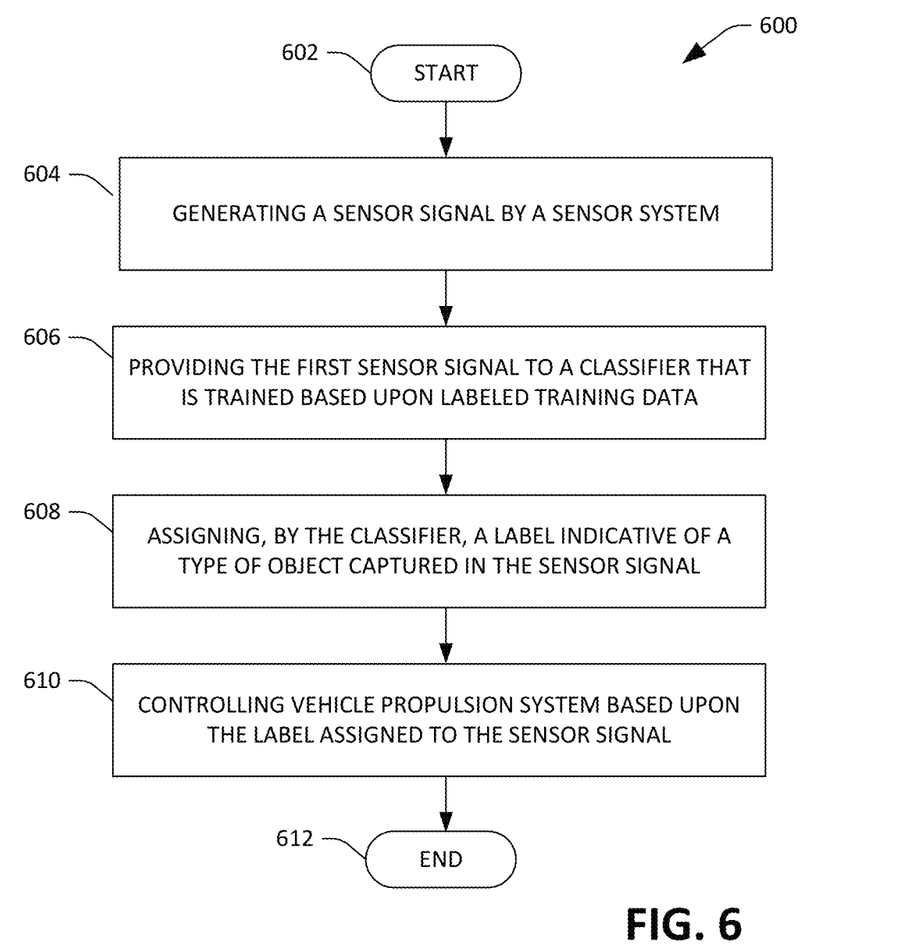
FIG. 6 is a flow diagram illustrating an exemplary methodology for controlling an autonomous vehicle based upon a label assigned to a sensor signal by a trained object classifier.
Figure 7:
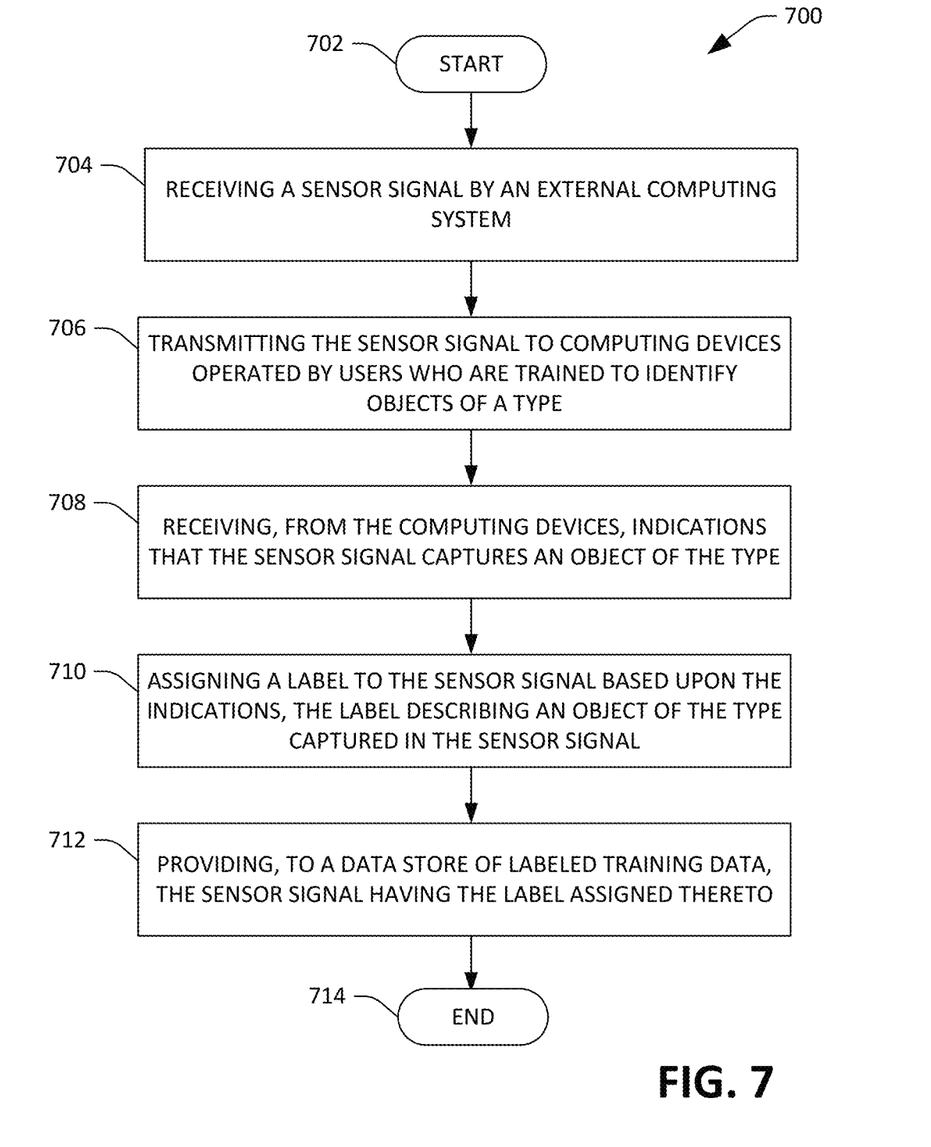
FIG. 7 is a flow diagram illustrating an exemplary methodology for generating labeled training data.

FIGS. 6 and 7 illustrate exemplary methodologies relating generating labeled training data and controlling an autonomous vehicle based upon the labeled training data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a high-level illustration of an exemplary methodology 600 for controlling an autonomous vehicle based upon a label output by a trained classifier is illustrated. The methodology 600 starts at 602, and at 604 a sensor signal is generated by a sensor system that captures an object in proximity to the autonomous vehicle. At 606, the sensor signal is provided to a trained classifier. The object classifier is generated by a learning system that receives labeled training data. At 608, the trained classifier assigns a label to the sensor signal that is indicative of a type of object captured in the sensor signal and provides the label to a control system incorporated in the autonomous vehicle. At 610, a vehicle propulsion system of the autonomous vehicle is controlled by the control system based upon the label assigned to the sensor signal. The methodology 600 completes at 612.

Referring now to FIG. 7, a high-level illustration of an exemplary methodology 700 for generating labeled training data is illustrated. The methodology 700 starts at 702, and at 704 a sensor signal is received by an external computing system. The sensor signal may be provided from a data store comprising information accumulated by a data collection vehicle. At 706, the sensor signal is transmitted by the external computing system to individual computing devices operated by users who are trained to identify specific types of objects. At 708, the external computing system receives indications by the individual computing devices that the sensor signal captures a specific type of object. The indications generally correspond to two computing devices that provide the same indication regarding an object captured in the sensor signal. At 710, a label is assigned to the sensor signal based upon the indications, the label describing the type of object captured in the sensor signal. For example, the label may broadly indicate that the sensor signal captures a static object or provide a more specific indication such as a construction cone or barrel. At 712, the label assigned to the sensor signal is incorporated as labeled training data provided to a data store. The methodology 700 completes at 714.

Figure 8:
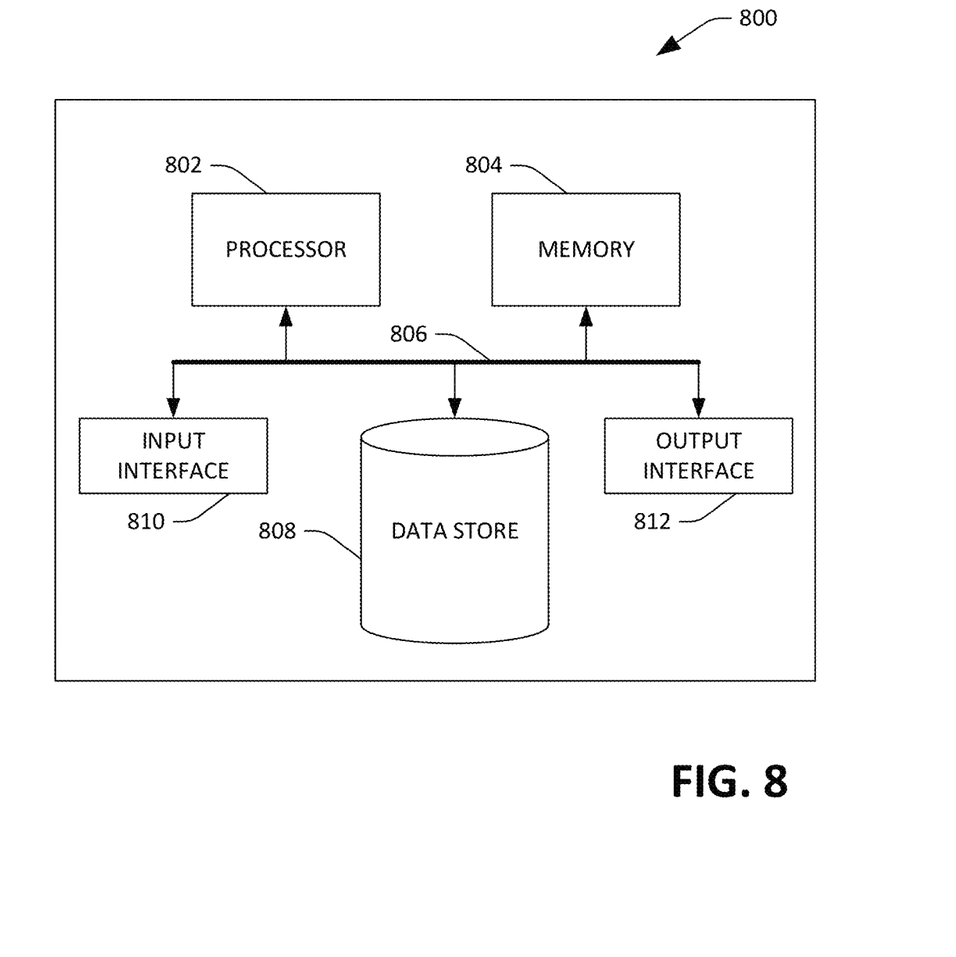
FIG. 8 illustrates an exemplary computing system.

Referring now to FIG. 8, a high-level illustration of an exemplary computing device 800 that can be used in accordance with the systems and methodologies disclosed herein is illustrated. For instance, the computing device 800 may be or include the computing system 112. The computing device 800 includes at least one processor 802 that executes instructions that are stored in a memory 804. The instructions may be, for instance, instructions for implementing functionality described as being carried out by one or more modules and systems discussed above or instructions for implementing one or more of the methods described above. The processor 802 may be a GPU, a plurality of GPUs, a multi-core processor, etc. The processor 802 may access the memory 804 by way of a system bus 806. In addition to storing executable instructions, the memory 804 may also store confidence scores, prior probability data, sensor data, training data, etc.

The computing device 800 additionally includes a data store 808 that is accessible by the processor 802 by way of the system bus 806. The data store 808 may include executable instructions, sensor data, probability data, training data, confidence scores, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 106, the braking system 108, and/or the steering system 110 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An autonomous vehicle comprising:
a vehicle propulsion system;
a sensor system that is configured to output sensor signals;
a computing system in communication with the vehicle propulsion system and the sensor system, wherein the computing system comprises:
a processor; and
memory that stores instructions that, when executed by the processor, cause the processor to perform acts comprising:
assigning a label to a first sensor signal output by the sensor system, the label being indicative of a type of an object captured in the first sensor signal, wherein the label is assigned to the first sensor signal based upon output of an object classifier system provided with the sensor signal, wherein the object classifier system is trained based upon labeled training data, and further wherein the labeled training data is generated through acts comprising:
receiving, at a remote computing system, a second sensor signal output by a second sensor system coupled to a vehicle;
selecting, by the remote computing system and from amongst several client computing devices, a first client computing device operated by a first user and a second client computing device operated by a second user, wherein the first client computing device and the second client computing device are selected due to the first user and the second user being trained to identify objects of the type in sensor signals output by sensor systems;
transmitting, by the remote computing system, the second sensor signal to the first client computing device and the second client computing device upon the remote computing system selecting the first client computing device and the second client computing device;
receiving, at the remote computing system and from both the first client computing device and the second client computing device, indications that the second sensor signal captures a second object of the type; and
assigning, by the remote computing system, a second label to the second sensor signal based upon the indications, wherein the second label indicates that the second object captured in the second sensor signal is of the type, and further wherein the training data comprises the second sensor signal with the second label assigned thereto; and
controlling the vehicle propulsion system based upon the label assigned to the first sensor signal.

2. The autonomous vehicle of claim 1, wherein the first computing device and the second computing device display the second signal on displays of the first computing device and the second computing device, and further wherein the second object is highlighted to indicate that the first user and the second user are to assign a label to the second object.

3. The autonomous vehicle of claim 1, wherein the labeled training data is generated through additional acts comprising:
upon assigning, by the remote computing system, the second label to the second sensor signal, selecting, by the remote computing system and from amongst the several client computing devices, a third client computing device operated by a third user and a fourth client computing device operated by a fourth user, wherein the third client computing device and the fourth client computing device are selected by the remote computing system due to the third user and the fourth user being trained to identify objects of a sub-type of the type in sensor signals output by sensor systems;
transmitting, by the remote computing system, the second sensor signal to the third client computing device and the fourth client computing device upon the remote computing system selecting the third client computing device and the fourth client computing device;
receiving, at the remote computing system and from both the third computing device and the fourth client computing device, second indications that the second object is of the sub-type of the type; and assigning, by the remote computing system, a third label to the second sensor signal based upon the second indications, wherein the third label indicates that the second object captured in the second sensor signal is of the sub-type of the type.

4. The autonomous vehicle of claim 3, wherein the third label is a multi-layered label that identifies the type of the second object and the sub-type of the second object.

5. The autonomous vehicle of claim 4, wherein the type of the object is one of a moving object or a static object.

6. The autonomous vehicle of claim 1, wherein a learning system receives the training data to generate the object classifier system.

7. The autonomous vehicle of claim 1, wherein the labeled training data is generated through acts further comprising:
 prior to selecting the second client computing device, selecting, by the remote computing system, a third client computing device from amongst the several client computing devices, wherein the third client computing device is operated by a third user, and further wherein the third client computing device is selected due to the third user being trained to identify objects of the type in the sensor signals output by the sensor systems;
 prior to transmitting, by the remote computing system, the second sensor signal to the second client computing device, transmitting, by the remote computing system, the second sensor signal to the third client computing device;
 receiving, at the remote computing system and from the third computing client computing device, an indication that the second object in the second sensor signal is of a second type that is different from the type; and
 only after receiving the indication from the third computing device, selecting the second client computing device from amongst the several client computing devices.

8. The autonomous vehicle of claim 1, wherein the type of the second object is amongst a predefined hierarchy of object types.

9. A method for training a computer-implemented classifier that is configured to assign labels to objects in sensor signals output by sensor systems of an autonomous vehicle, wherein the method is performed by a computing system, the method comprising:
 receiving an image generated by a camera of a vehicle, wherein the image is of surroundings of the vehicle as the vehicle navigated over a roadway, and further wherein the image captures an object;
 selecting, from at least three client computing devices, a first client computing device operated by a first user and a second client computing device operated by a second user, wherein the first client computing device and the second client computing device are selected due to the first user and the second user being trained to identify objects of a predefined type in images output by cameras;
 upon selecting the first client computing device and the second client computing device, transmitting the image to the first client computing device and the second client computing device;
 subsequent to transmitting the image to the first client computing device and the second client computing device, receiving indications from both the first client computing device and the second client computing device that the object captured in the image is of the predefined type;
 only after receiving the indications from both the first client computing device and the second client computing device, assigning a label to the image, the label noting that the object captured in the image is of the predefined type; and
 training an object classifier system based upon the image and the label assigned to the image, wherein the object classifier system is trained to identify objects of the predefined type as an autonomous vehicle navigates roadways, and further wherein a vehicle propulsion system of the autonomous vehicle is controlled based upon output of the object classifier system upon the output classifier being provided with images output by cameras of the autonomous vehicle.

10. The method of claim 9, further comprising:
 prior to transmitting the image to the first client computing device and the second client computing device, defining a region of the image that includes the object; and
 prior to transmitting the image to the first client computing device and the second client computing device, highlighting the region of the image in the image such that the region is highlighted when viewed on displays of the first client computing device and the second client computing device.

11. The method of claim 10, wherein the region is assigned the label.

12. The method of claim 9, further comprising:
 prior to transmitting the image to the second client computing device, selecting a third client computing device from amongst the at least three client computing devices, wherein the third client computing device is selected due to an operator of the third client computing device being trained to identify objects of the predefined type;
 prior to transmitting the image to the second client computing device, transmitting the image to the third client computing device;
 subsequent to transmitting the image to the third client computing device, receiving from the third client computing device an indication that the object is of a type that is different from the predefined type, wherein the image is transmitted to the second client computing device only after the indication that the object is different from the predefined type is received from the third client computing device.

13. The method of claim 9, further comprising:
 subsequent to assigning the label to the image, selecting, from amongst the at least three client computing devices, a third client computing device operated by a third user and a fourth client computing device operated by a fourth user, wherein the third client computing device and the fourth client computing device are selected due to the third user and the fourth user being trained to identify objects of a predefined sub-type of the predefined type;
 upon selecting the third client computing device and the fourth client computing device, transmitting the image to the third client computing device and the fourth client computing device;
 receiving, from the third client computing device, an indication that the third user has identified the object as being of the predefined sub-type of the predefined type;
 receiving, from the fourth client computing device, an indication that the fourth user has identified the object as being of the predefined sub-type of the predefined type;

only upon receiving both the indication from the third client computing device and the indication from the fourth client computing device, updating the label, the updated label noting that the object captured in the image is of the predefined sub-type of the predefined type, wherein the object classifier system is trained based upon the updated label.

14. The method of claim 9, wherein the first computing device and the second computing device display the image on displays of the first computing device and the second computing device, and further wherein the second object is highlighted to indicate that the first user and the second user are to assign a label to the second object.

15. The method of claim 9, wherein receiving the image generated by the camera of the vehicle comprises sampling the image from a plurality of images generated by a plurality of cameras of a plurality of vehicles.

16. The method of claim 9, wherein the object classifier system comprises a computer-implemented neural network, and wherein the computer-implemented neural network is trained based upon the image and the label assigned to the image.

17. A computing system comprising:
a processor; and
memory storing instructions that, when executed by the processor, cause the processor to perform acts comprising:
receiving a sensor signal generated by a sensor system of a vehicle, wherein the sensor signal is indicative of surroundings of the vehicle as the vehicle navigated over a roadway when the sensor system generated the sensor signal, and further wherein the sensor signal captures an object;
selecting, from at least three client computing devices, a first client computing device operated by a first user and a second client computing device operated by a second user, wherein the first client computing device and the second client computing device are selected due to the first user and the second user being trained to identify objects of a predefined type in sensor signals output by sensor systems;
upon selecting the first client computing device and the second client computing device, transmitting the sensor signal to the first client computing device and the second client computing device;
subsequent to transmitting the sensor signal to the first client computing device and the second client computing device, receiving indications from both the first client computing device and the second client computing device that the object captured in the sensor signal is of the predefined type;
only after receiving the indications from both the first client computing device and the second client computing device, assigning a label to the sensor signal, the label noting that the object captured in the sensor signal is of the predefined type; and
training an object classifier system based upon the sensor signal and the label assigned to the sensor signal, wherein the object classifier system is trained to identify objects of the predefined type as an autonomous vehicle navigates roadways based upon sensor signals output by sensor systems of the autonomous vehicle, and further wherein a vehicle propulsion system of the autonomous vehicle is controlled based upon output of the object classifier system upon the output classifier being provided with the sensor signals output by the sensor systems of the autonomous vehicle.

18. The computing system of claim 17, wherein the sensor system is a camera, and further wherein the sensor signal is an image.

19. The computing system of claim 17, wherein the sensor system is a lidar system, and further wherein the sensor signal is a point cloud generated by the lidar system.

* * * * *